United States Patent
Fukuchi et al.

(10) Patent No.: US 12,386,727 B2
(45) Date of Patent: Aug. 12, 2025

(54) METHOD AND APPARATUS FOR BUG BOUNTY SYSTEM FOR BLOCKCHAIN

(71) Applicant: HITACHI, Ltd., Tokyo (JP)

(72) Inventors: Kaiho Fukuchi, Santa Clara, CA (US); Takayuki Suzuki, Cupertino, CA (US); Takatoshi Ohara, Cupertino, CA (US); Shin Tezuka, Campbell, CA (US); Nobutaka Kawaguchi, Santa Clara, CA (US); Ken Naganuma, Campbell, CA (US)

(73) Assignee: HITACHI, Ltd., Tokyo (JP)

( * ) Notice: Subject to any disclaimer, the term of this patent is extended or adjusted under 35 U.S.C. 154(b) by 168 days.

(21) Appl. No.: 18/144,714

(22) Filed: May 8, 2023

(65) Prior Publication Data

US 2024/0378284 A1 Nov. 14, 2024

(51) Int. Cl.
*G06F 11/362* (2025.01)

(52) U.S. Cl.
CPC ........ *G06F 11/3636* (2013.01); *G06F 11/362* (2013.01)

(58) Field of Classification Search
CPC .............................. G06F 11/3636; G06F 11/362
USPC .................................................. 717/126–140
See application file for complete search history.

(56) References Cited

U.S. PATENT DOCUMENTS

| | | | | |
|---|---|---|---|---|
| 5,911,041 A * | 6/1999 | Schaffer | ............... | G06F 11/3672 714/E11.208 |
| 7,587,709 B2 * | 9/2009 | Chilimbi | ............... | G06F 11/366 717/130 |
| 7,971,190 B2 * | 6/2011 | Davies | ............... | G06F 11/3466 717/130 |
| 9,015,847 B1 * | 4/2015 | Kaplan | ............... | G06Q 30/0208 726/25 |
| 9,223,978 B2 * | 12/2015 | Kraemer | ............. | H04L 63/1433 |
| 9,413,780 B1 * | 8/2016 | Kaplan | ............... | G06Q 30/0208 |
| 10,771,239 B2 * | 9/2020 | Nandakumar | ........ | H04L 9/3239 |
| 11,489,854 B2 | 11/2022 | Dumont et al. | | |
| 11,645,188 B1 * | 5/2023 | Azad | ......................... | G06F 8/70 717/126 |
| 11,748,232 B2 * | 9/2023 | Muras | ................. | G06F 11/3608 717/126 |
| 2020/0027089 A1 * | 1/2020 | Kuchar | ................. | H04L 9/3239 |
| 2022/0318399 A1 * | 10/2022 | Rodler | .................... | G06F 21/51 |

(Continued)

OTHER PUBLICATIONS

Hasnaoui et al, "Beyond the Bug Bounty Programs Trilemma: Bounty 3.0's Blockchain-ZKP Approach", IEEE, pp. 663-668 (Year: 2023).*

(Continued)

*Primary Examiner* — Anil Khatri
(74) *Attorney, Agent, or Firm* — Procopio, Cory, Hargreaves & Savitch LLP

(57) ABSTRACT

Example implementations provide a blockchain-based bug bounty platform/system for discovering system vulnerability. To prevent attack method from becoming public, the attack and test are performed in the attacker's (end-user's) private blockchain (BC) environment, and the confidential computing technology provides proof of testing. The amount of the reward awarded may vary based on the rarity of the vulnerability discovered. The feature values of current transactions are extracted and compared against features values of prior transactions to determine vulnerabilities and associated rewards.

18 Claims, 14 Drawing Sheets

(56) References Cited

U.S. PATENT DOCUMENTS

2023/0019180 A1* 1/2023 de Nijs ................ G06F 21/577

OTHER PUBLICATIONS

Badash et al, "Blockchain-based Bug Bounty Framework", ACM, pp. 239-248 (Year: 2021).*
Breidenbach et al, "The Hydra Framework for Principled, Automated Bug Bounties", IEEE, pp. 1-9 (Year: 2019).*
Yi et al, "An Empirical Study of Blockchain System Vulnerabilities: Modules, Types, and Patterns", ACM, pp. 1-13 (Year: 2022).*
Ding et al, "Ethical Hacking for Boosting IoT Vulnerability Management: A First Look into Bug Bounty Programs and Responsible Disclosure", ACM, pp. 1-7 (Year: 2019).*

* cited by examiner

| State ID 501 | A | B | C | Transfer |
|---|---|---|---|---|
| Monitoring Item 502 | Overflow | Division by Zero | Other Anomalous Condition | Send token |
| Monitoring Method 503 | Function A | Function B | Function C | Function D |

FIG. 5

| Feature Values 600 | B, C, Transfer |
|---|---|

FIG. 6

| Test ID 701 | Test Method 702 |
|---|---|
| 1 | Always admin account balance >= 0 |
| 2 | Transfer of money between administrators = success |

FIG. 7

| Feature Values 600 | B, C, Transfer |
|---|---|
| Failure Test IDs 801 | 1 |
| Signature 802 | AD0E22DDFFF... |
| Environment Information 803 | TEE (Intel SGX2.0) |

FIG. 8

| Transaction ID 901 | Contact Address 902 | Parameter1 903 | Parameter2 904 | Parameter3 905 | Sender Identity 906 |
|---|---|---|---|---|---|
| 1 | 0xAAAAAA | Transfer | 0xXXXX | -1 | 0x111111 |
| 2 | 0xBBBBBB | Withdraw | 0xYYYY | 10 | 0x111111 |
| 3 | 0xCCCCCC | Send | 0xZZZZ | -1 | 0x222222 |

FIG. 9

| State ID 1601 | A | B | C |
|---|---|---|---|
| Monitoring Item 1602 | Re-entrant condition | Multiple calls to constructs | Other Potential Vulnerability |
| Monitoring Method 1603 | Function A | Function B | Function C |

METHOD AND APPARATUS FOR BUG BOUNTY SYSTEM FOR BLOCKCHAIN

BACKGROUND

Field

The present disclosure is generally directed to a method and a system for bug bounty generation.

Related Art

Blockchain is a system that allows an unspecified number of people to be connected via peer-to-peer (P2P) to run numerous applications. Applications that run on the blockchain are called smart contracts. End users can develop any smart contract and deploy it on the blockchain. For example, many crypto asset trading applications run on top of the blockchain. When an end user issues a transaction to a smart contract, a blockchain node, referred to as a minor, generates the block data that bundles the transaction. Once the miner generates the block, the miner distributes the block data to other nodes. The other nodes then execute the transactions in the block data and update the state of the smart contract. The blockchain is transparent because everyone can see the block data which contains all of transaction logs. In addition, crypto asset on the blockchain are subject to speculation. Therefore, the smart contracts that manage crypto assets must be bug-free.

While BC is being used by the public, there have been a number of incidents where vulnerabilities in those applications (smart contracts) have been exploited to steal digital assets fraudulently. For example, the DAO, a digital decentralized autonomous organization, was hacked due to vulnerabilities in smart contracts. The Ethereum blockchain was eventually hard forked to restore the stolen funds. Therefore, each smart contract must be highly reliable (bug-free).

In the related art, a method of using third party to find and report software bugs using reward as compensation/motivation is disclosed. The method is commonly referred to as a bug bounty platform. A bona fide attacker looks for a defect in the target system. When the attacker finds a bug, he/she sends a bug report to the administrator via the bounty platform. The administrator then checks to see if the bug report is true and pays the reporter a bounty.

In the related art, a method of implementing an incentivized-based intrusion detection system to detect malicious acts against an asset is disclosed. The incentive may lure or facilitate the actor to provide information detecting malicious actions against an asset. The system administrator places an asset on the target environment (e.g. production web server) that is known only to the administrator. When malicious actors find the asset by exploiting the vulnerability, they send the asset to a blockchain smart contract. The smart contract checks to see if the asset was indeed placed by the administrator and pays a reward if so. However, the method does not motivate attackers to report the attacks they have tried. It motivates attackers to reveal their attack methods only when they are successful. As a result, each attacker or administrator cannot know what others have attempted, and they may all try the same attack, making it time-consuming to find bugs and vulnerabilities. In addition, blockchain generates block data that contain transaction logs, which are accessible by everyone. Therefore, if someone illegally obtains an asset due to a vulnerability, the attack method will be revealed to everyone. As a result, others can copy and repeat the attack.

While it is difficult to evaluate unknown vulnerabilities in advance, the related art does not disclose a way to properly estimate the value of a vulnerability. Vulnerabilities can be basic ones that can be applied to other attacks or unprecedented ones that are very difficult to find. It is desirable to pay high bounties for basic and rare defects. Furthermore, it would not be possible to determine whether a bug is an applicable or rare defect until a certain amount of time has passed since the bug was found. A one-time incentive payment immediately after a bug is found will not provide an appropriate incentive based on the severity of the bug.

In the related art, confidential computing methods have emerged in recent years, utilizing hardware and mathematical methods to create encrypted data through an encrypted memory area called enclave, which is impossible to access, even by a machine administrator. This allows, for example, a video distributor to send encrypted video data in the enclave rather than passing raw video data to the end user. The video can then be decrypted gradually within the enclave and shown to the end user. While the related art allows for placement of secret data on end-user machines, it is also known to be vulnerable to side-channel attacks.

SUMMARY

Aspects of the present disclosure involve an innovative method for generating blockchain bug bounty. The method may include performing, by a first processor, bug detection by issuing a transaction for execution in runtime of a private blockchain system, wherein the private blockchain system is set in a first node of a plurality of nodes, and the first node is a private blockchain node; monitoring the transaction in the runtime and outputting first feature values associated with the transaction, wherein the first feature values are generated by performing feature extraction on the transaction; communicating with an external system, wherein the external system performs: receiving, by a second processor, the first feature values; extracting, by the second processor, features of past transactions stored in nodes other than the first node of the plurality of nodes and outputting second feature values associated with the past transactions; generating, by the second processor, bounty information corresponding to a bug alert in the transaction, wherein the bounty information is generated by comparing the first feature values with the second feature values; and instructing, by the second processor, payment of bounty based on the bounty information, wherein the nodes other than the first node of the plurality of nodes are physical blockchain nodes.

Aspects of the present disclosure involve an innovative non-transitory computer readable medium, storing instructions for generating blockchain bug bounty. The instructions may include performing, by a first processor, bug detection by issuing a transaction for execution in runtime of a private blockchain system, wherein the private blockchain system is set in a first node of a plurality of nodes, and the first node is a private blockchain node; monitoring the transaction in the runtime and outputting first feature values associated with the transaction, wherein the first feature values are generated by performing feature extraction on the transaction; communicating with an external system, wherein the external system performs: receiving, by a second processor, the first feature values; extracting, by the second processor, features of past transactions stored in nodes other than the first node of the plurality of nodes and outputting second feature values associated with the past transactions; generating, by the second processor, bounty information corresponding to a bug alert in the transaction, wherein the bounty information is generated by comparing the first feature values with the second feature values; and instructing, by the second processor, payment of bounty based on the bounty information, wherein the nodes other than the first node of the plurality of nodes are physical blockchain nodes.

Aspects of the present disclosure involve an innovative server system for generating blockchain bug bounty. The system may include performing, by a first processor, bug detection by issuing a transaction for execution in runtime of a private blockchain system, wherein the private blockchain system is set in a first node of a plurality of nodes, and the first node is a private blockchain node; monitoring the transaction in the runtime and outputting first feature values associated with the transaction, wherein the first feature values are generated by performing feature extraction on the transaction; communicating with an external system, wherein the external system performs: receiving, by a second processor, the first feature values; extracting, by the second processor, features of past transactions stored in nodes other than the first node of the plurality of nodes and outputting second feature values associated with the past transactions; generating, by the second processor, bounty information corresponding to a bug alert in the transaction, wherein the bounty information is generated by comparing the first feature values with the second feature values; and instructing, by the second processor, payment of bounty based on the bounty information, wherein the nodes other than the first node of the plurality of nodes are physical blockchain nodes.

Aspects of the present disclosure involve an innovative system for generating blockchain bug bounty. The system may include means for performing, by a first processor, bug detection by issuing a transaction for execution in runtime of a private blockchain system, wherein the private blockchain system is set in a first node of a plurality of nodes, and the first node is a private blockchain node; means for monitoring the transaction in the runtime and outputting first feature values associated with the transaction, wherein the first feature values are generated by performing feature extraction on the transaction; means for communicating with an external system, wherein the external system performs: means for receiving, by a second processor, the first feature values; means for extracting, by the second processor, features of past transactions stored in nodes other than the first node of the plurality of nodes and outputting second feature values associated with the past transactions; generating, by the second processor, bounty information corresponding to a bug alert in the transaction, wherein the bounty information is generated by comparing the first feature values with the second feature values; and instructing, by the second processor, payment of bounty based on the bounty information, wherein the nodes other than the first node of the plurality of nodes are physical blockchain nodes.

Aspects of the present disclosure involve an innovative server system for generating blockchain bug bounty. The system may include a plurality of nodes; a private blockchain system being set in a first node of the plurality of nodes, wherein the first node is a private blockchain node, and the private blockchain system comprises: a first processor configured to: receive a transaction for execution in runtime for bug detection, and monitor the transaction in the runtime and extract features of the transaction to output first feature values; and an external system in communication with the private blockchain system, the external system comprises: a second processor configured to: extract features of past transactions stored in nodes other than the first node of the plurality of nodes and outputs second feature values; and generate a bounty information corresponding to a bug alert in the transaction, wherein the bounty information is generated by comparing the first feature values with the second feature values, wherein the second processor instructs payment of bounty based on the bounty information, and wherein the nodes other than the first node of the plurality of nodes are physical blockchain nodes.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

FIG. 5 illustrates an example abnormal state inspection method table 500 associated with feature extractor 420 and feature extractor 422, in accordance with an example implementation.

FIG. 6 illustrates example feature values 600 of a transaction extracted by the feature extractor 420 or feature extractor 422, in accordance with an example implementation.

FIG. 7 illustrates an example test method table 700 as utilized by the test report generator 430, in accordance with an example implementation.

FIG. 8 illustrates an example test report 800 generated by the test report generator 430, in accordance with an example implementation.

FIG. 9 illustrates example transactions 900, in accordance with an example implementation.

DETAILED DESCRIPTION

Figure 1:
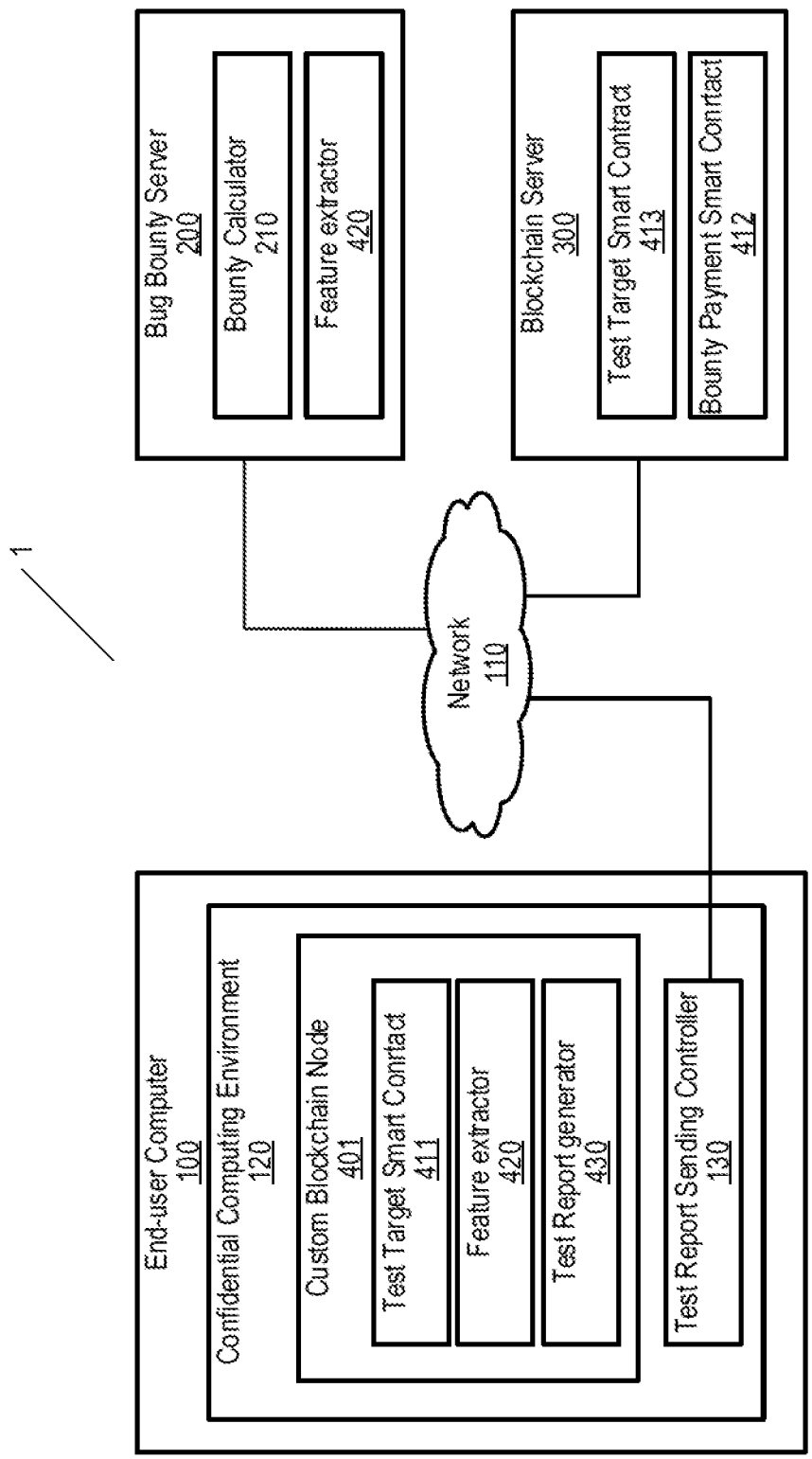
FIG. 1 illustrates an example bug bounty system/platform 1, according to an example implementation.

The following detailed description following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations provide a bug bounty platform/system for blockchain. To prevent attack method from becoming public, the attack and test are performed in the attacker's (end-user's) private blockchain (BC) environment, and the confidential computing technology provides proof of testing. Testing is the process of verifying that the attack caused a target smart contract to go into an abnormal state (e.g. always "bank account balance>=0"). Because of the possibility of tampering by end-users, administrators of bug bounty platforms cannot trust test results generated in the end-user environments. Here, the use of confidential computing technology makes it difficult to tamper with test results.

Example implementations also provide a bug bounty platform/system for discovering system vulnerability. The amount of the reward will vary depending on the rarity of the vulnerability discovered. However, to check the rarity of the vulnerability, the degree of similarity to previous transactions must first be determined. Transactions are not easily comparable to each other. Therefore, the feature values of transactions are extracted and compared against each other. Extracting feature values of transactions enables detection of similar transactions and calculate reality of vulnerabilities.

Example implementations also provide a bug bounty platform/system for rapid reward disbursement that reflects bug severity. In order to reflect changes in bug evaluation over time in the reward amount, not only is the reward paid immediately, but the amount also reflects the severity of the bug (rarity, basicity, scale of damage, etc.) Severity is analyzed based on transactions that are issued to other smart contracts after the test, and an additional reward amount is dynamically calculated and paid. To get more information from end-users, the bug bounty system pays some bounty for bug reports that indicate the existence of potential vulnerabilities, such as re-entrant.

FIG. 1 illustrates an example bug bounty system/platform 1, according to an example implementation. As illustrated in FIG. 1, the bug bounty system/platform 1 may include an end-user computer 100, a bug bounty server 200, and a blockchain server 300. Each of the end-user computer 100, the bug bounty server 200, and the blockchain server 300 is a computer with computing power, memory, persistent storage, and the ability to communicate over a network. Such computer may be a physical computer server, a virtual machine, a container, a combination of a plurality of computers, or other technology in accordance with the desired implementation.

The end-user computer 100, the bug bounty server 200, and the blockchain server 300 communicate with one another through a network 110. The network 110 may be a local area network (LAN), wide area network (WAN), private area network (VPN), a wired network or a wireless network. Communications between the components can be encrypted and/or secured, for example, by using TLS.

The end user's computer 100 is primarily a machine used by an attacker and has a Confidential Computing Environment (CCE) 120 realized in Trusted Execution Environment (TEE), etc. A custom blockchain node 401 runs on the Confidential Computing Environment 120, and performs realization of the blockchain environment. The custom blockchain node 401 may include a test target smart contract 411, a feature extraction unit 420, and a test report generator 430. The custom blockchain node 401 is a private blockchain node that operates only within the end user's computer 100, unlike a general blockchain node 400, where many blockchain nodes 400 communicate with each other. The blockchain nodes 400 together form a blockchain network.

The test target smart contract 411 is a smart contract for which the administrator or attacker looks for bugs in order to improve blockchain quality. The attacker aims to issue arbitrary transactions to the test target smart contract 411 to be tested and to make the state abnormal. The feature extractor 420 extracts the feature values of the transactions which are input for the smart contract 411. By extracting the feature values, it is possible to determine whether transactions to different smart contracts are attacks that share a common intention. When an attacker issues a transaction to a smart contract 411, feature extractor 420 analyzes the features of the transaction and outputs the associated features values.

The test report generator 430 checks whether the test target smart contract 411 is in an abnormal state. The test report generator 430 adds a digital signature to the test results and the feature values, and outputs them as a test report. The test report sending controller 130 then transmits the test report to the bug bounty server 200. In some example implementations, the bug bounty server 200 is a computer owned by the organization operating the bug bounty platform.

The bug bounty system server 200 may include components such as, but not limited to, a bounty calculator 210 and a feature extractor 422. When the bug bounty server 200 receives a test report from the test report sending controller 130, it first verifies the digital signature of the test report. On completion of verification, the bounty calculator 210 begins the process of bounty calculation for the attack method as indicated in the test report. In order to calculate the bounty, feature values of the past transactions included in the block data that the blockchain node 400 are generated using the feature extractor 420. By comparing the feature values of the transactions in the attack report with the feature values of the past transactions using the bounty calculator 210, the scarcity of the attack method, etc. can be determined and the reward amount is notified to the reward payment smart contract 412 for performance of payment disbursement.

Past transactions are stored in a blockchain server 300 as block data. The blockchain server 300 is a computer with blockchain nodes 400. A number of blockchain servers 300 are interconnected through the network 110. The blockchain server 300 is a production environment such as the Ethereum main net. The blockchain server 300 is not interconnected with the custom blockchain node 401 located in the confidential computing environment 120. Therefore, block data generated within custom blockchain node 401 is not distributed to any of the blockchain nodes 400 of the blockchain server 300 or to any other computers within the system.

Each blockchain node 400 may include a test target smart contract 413 and a bounty payment smart contract 412. The test target smart contract 413 functions the same as the test target smart contract 411 and is used for bug detection to improve blockchain quality. After receiving payment order/ instruction, the bounty payment smart contract 412 pays the reward to the attacker. This sequence allows the attacker to receive an amount of reward that corresponds to the rarity of the bug. In some example implementations, the test report sending controller 130 can directly issue test report to the bounty payment smart contract 412, which can then perform signature verification on the received test report. The bounty payment smart contract 412 may then retrieve the bounty information and pay the bounty by interfacing with the bounty calculator 210.

Figure 2:
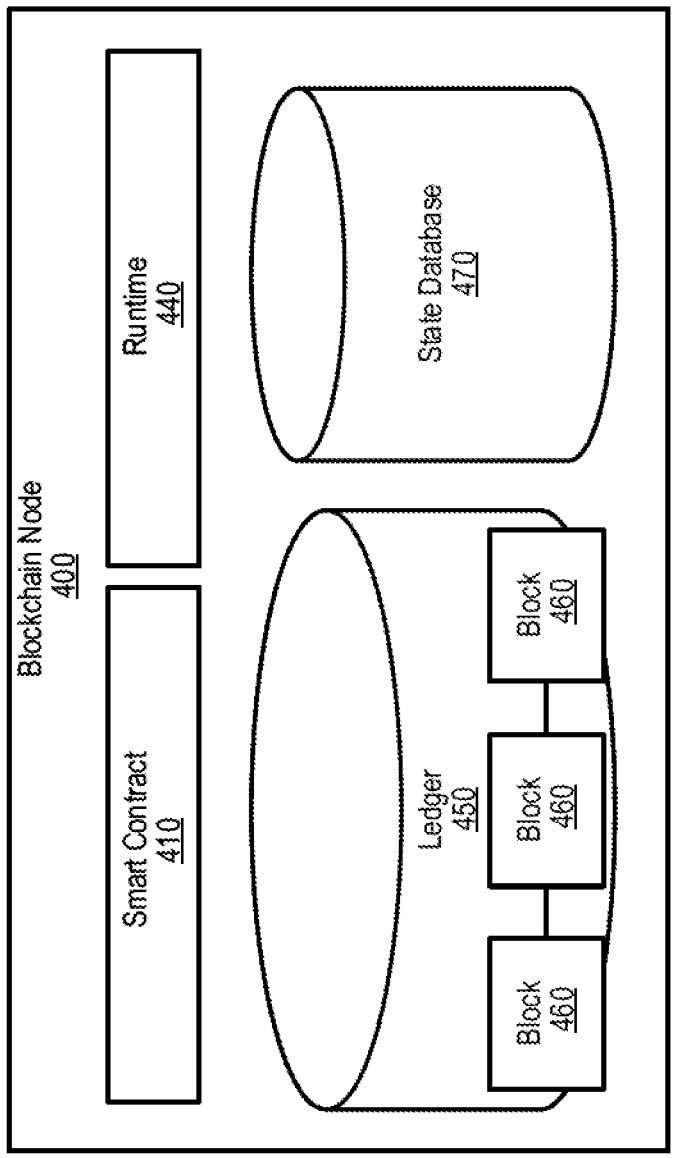
FIG. 2 illustrates an example blockchain node 400, in accordance with an example implementation.

FIG. 2 illustrates an example blockchain node 400, in accordance with an example implementation. As illustrated in FIG. 2, the blockchain node 400 may include components such as one or more smart contracts 410, a runtime 440, a ledger 450, and a state database 470. The runtime 440 is the execution environment of the smart contracts 410. The ledger 450 stores the one or more data blocks 460. The state database 470 stores the state of smart contracts 410. When a user issues a transaction against a smart contract 410, the particular transaction is bundled with other transactions by the associated blockchain node 400 to generate a data block 460. The data block 460 is then transferred to another blockchain node 400 via network 110. When the blockchain node 400 receives the data block 460, it takes the transactions contained in the data block 460 one by one and inputs them into the smart contract 410. The smart contract 410 is then executed on an associated runtime 440, which, for example, can be an Ethereum virtual machine. The results of the execution of the smart contract 410 (e.g., values of variables) are then stored in the state database 470.

Figure 3:
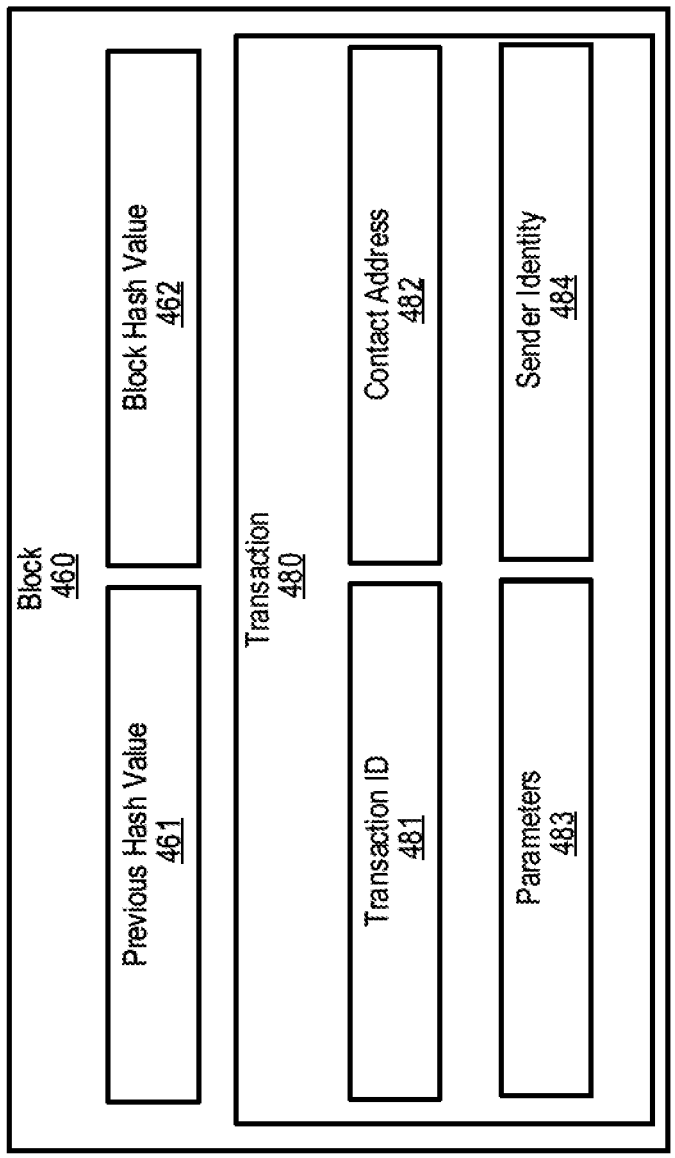
FIG. 3 illustrates an example data block 460, in accordance with an example implementation.

FIG. 3 illustrates an example data block 460, in accordance with an example implementation. Data block 460 has a previous hash value 461, a hash value 462 of the current block, and one or more transaction data 480. The previous hash value 461 represents the hash value of the previous data block. The hash value 462 represents hash value of the current block. Each of the transaction data 480 may include transaction ID 481, contract address 482, parameters 483, and a digital signature 484. The transaction ID 481 indicates the transaction identification. The contract address 482 is the address of the smart contract used to execute the transaction. Parameters 483 represent arguments to the smart contract. The digital signature 484 represents the identity of the sender/transaction issuer.

Figure 4:
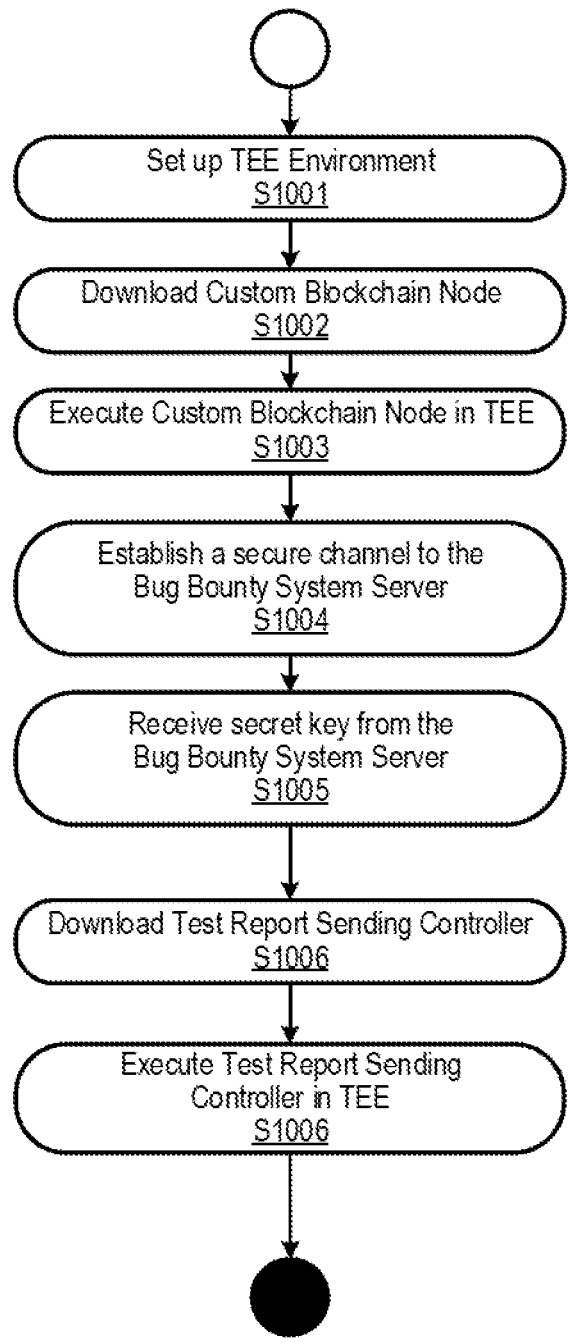
FIG. 4 illustrates an example process flow of test environment building by an end-user, in accordance with an example implementation.

FIG. 4 illustrates an example process flow of test environment building by an end-user, in accordance with an example implementation. The process begins at step S1001, wherein the end-user builds a TEE environment, where the confidential computing environment is realized, on the end-user computer 100. Step S1001 may involve installation of driver software, software development kit (SDK), etc. At step S1002, the custom blockchain node 401 is downloaded from the bug bounty server 200, which is built by the administrator of the bug bounty server 200. Specifically, it is an executable binary for the TEE environment, with the inclusion of a feature extractor 420, a test target smart contract 411, and a test report generator 430.

The custom blockchain node 401 is then executed within the TEE at S1003. Custom blockchain node 401 then uses the TEE's functionality to establish a secure channel inside the TEE to the bug bounty server 200 at S1004. Using the established secure channel, the bug bounty server 200 can securely send a private key for signing into the custom blockchain node 401. The custom blockchain node 401 stores the received private key in memory or on disk after encrypting it at step S1005. This key is later used by the test report generator 430 to digitally sign the test report. Finally, the end user downloads the test report sending controller 130 from the bug bounty server 200 at step S1006 and executes the test report sending controller 130 in the TEE at step S1007.

FIG. 5 illustrates an example abnormal state inspection method table 500 associated with feature extractor 420 and feature extractor 422, in accordance with an example implementation. The abnormal state inspection method table 500 may include information such as, but not limited to, state ID 501, monitoring item 502, and monitoring method 503. State ID 501 indicates the unique identifier of the abnormal state to be inspected. Monitoring item 502 indicates the generic name of the abnormal state to be inspected. Monitoring method 503 indicates the processing to be performed to detect the abnormal state. For example, to detect an overflow for which state ID 501 is "A", the feature extractor 420 executes function A when runtime 440 executes a transaction. In addition, since attack transaction that exploit vulnerabilities often include remittance processing, the remittance processing may be included as one of the monitoring targets, as illustrated by the column of FIG. 5 where state ID is "transfer".

FIG. 6 illustrates example feature values 600 of a transaction extracted by the feature extractor 420 or feature extractor 422, in accordance with an example implementation. The feature values 600 has strings concatenated in the order in which the detected abnormal state IDs 501 occurred. Feature extractor 420 or feature extractor 422 executes the monitoring method 503 of the abnormal state inspection method table 500 when runtime 440 executes a transaction. The Feature extractor 420 or feature extractor 422 then records the state IDs 501 of the abnormal states detected at that time in order and generates feature values 600.

FIG. 7 illustrates an example test method table 700 as utilized by the test report generator 430, in accordance with an example implementation. As illustrated in FIG. 7, the test method table 700 may include information such as, but not limited to test ID 701 and test method 702. Test ID 701 are unique identifiers that identify the test method and test method 702 indicates the process to be executed for the test.

FIG. 8 illustrates an example test report 800 generated by the test report generator 430, in accordance with an example implementation. The test report 800 may include information such as, but not limited to, feature values 600, failure test IDs 801, signature 802, and environment information 803. Feature values 600 is illustrated in FIG. 6, which are characteristics of the attack transaction. Failure test IDs 801 represent set of IDs of failed tests. Signature 802 represents the private key obtained in step S1005 of FIG. 4. Environment information 437 indicates the type of confidential computing environment 120 in which the test was conducted.

FIG. 9 illustrates example transactions 900, in accordance with an example implementation. As illustrated in FIG. 9, a transaction may include input information such as transaction ID 901, contract address 902, parameters 903-905, and sender identity 906. Parameter 903 may include the name of the target function, parameter 904 may include information such as the first input value given to the function of parameter 903, and parameter 905 may include information such as second input value given to the function of parameter 903. Sender identity 906 indicates the identity of the transaction issuer.

Figure 10:
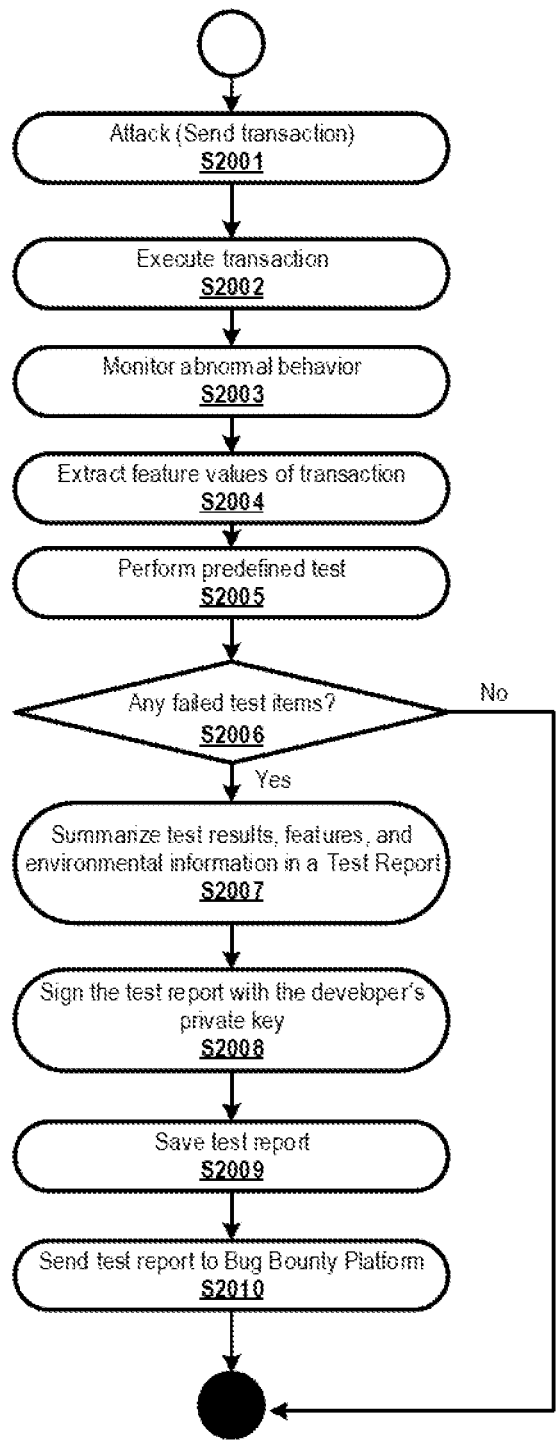
FIG. 10 illustrates a process flow for testing smart contract vulnerabilities as executed by end-user, in accordance with an example implementation.

FIG. 10 illustrates a process flow for testing smart contract vulnerabilities as executed by end-user, in accordance with an example implementation. The end user sends a transaction, such as a transaction 900 of FIG. 9, to the test target smart contract 411 at step S2001. The transaction is referred to below as the attack transaction and is intends to cause the test target smart contract 411 to enter an abnormal state. For example, a transaction may contain negative arguments.

Next, runtime 440 executes the test target smart contract 411 and processes the attack transaction at step S2002. At step S2003, the feature extractor 420 monitors the transaction in the runtime 440 for abnormal state and outputs/extracts feature values 600. For example, it is difficult to determine the similarity between transactions in FIG. 9 given the difference between the target smart contracts and associated parameters. On the other hand, by calculating the feature values of transactions, it is possible to determine the degree of similarity between the various transactions. At step S2004, feature values of transactions are extracted. Using FIG. 6 as illustration, feature values 600 correspond to "B. C, Transfer". Which means that at runtime 440, B, C, and transfer of state ID 501 of the abnormal state check method table 500 occurred in turn during transaction execution.

The test report generator 430 executes the tests method 702 predefined by the smart contract developer or bug bounty server administrator at step S2005. A determination is then made at step S2006 to determine if any test item has failed. If a test item has failed at step S2006, the test report generator 430 then generates a test report 800 at step S2007. At this time, information on the confidential computing environment 120, on which the test was run in, is added to the test report 800 as environmental information 803. Then, the test report generator 430 digitally signs the test report 800 using the private key at step S2008, as obtained in step S1005 of FIG. 4. Since the private key used for signature is known only to the administrator of the bug bounty server 200, by signing the test report 800 using the private key, it can be guaranteed that the test report 800 was indeed generated by the test report generator 430. Since the test report generator 430 is located in the confidential computing environment 120, even the end-user who manages the end-user computer 100 would not be able to obtain the private key. The test report generator 430 then stores/saves the test report 800 at step S2009. The end-user then uses the test report sending controller 130 to send the test report 800 to the bug bounty server 200 at step S2010, including the attacker's wallet address, for example the user's address in Ethereum.

Figure 11:
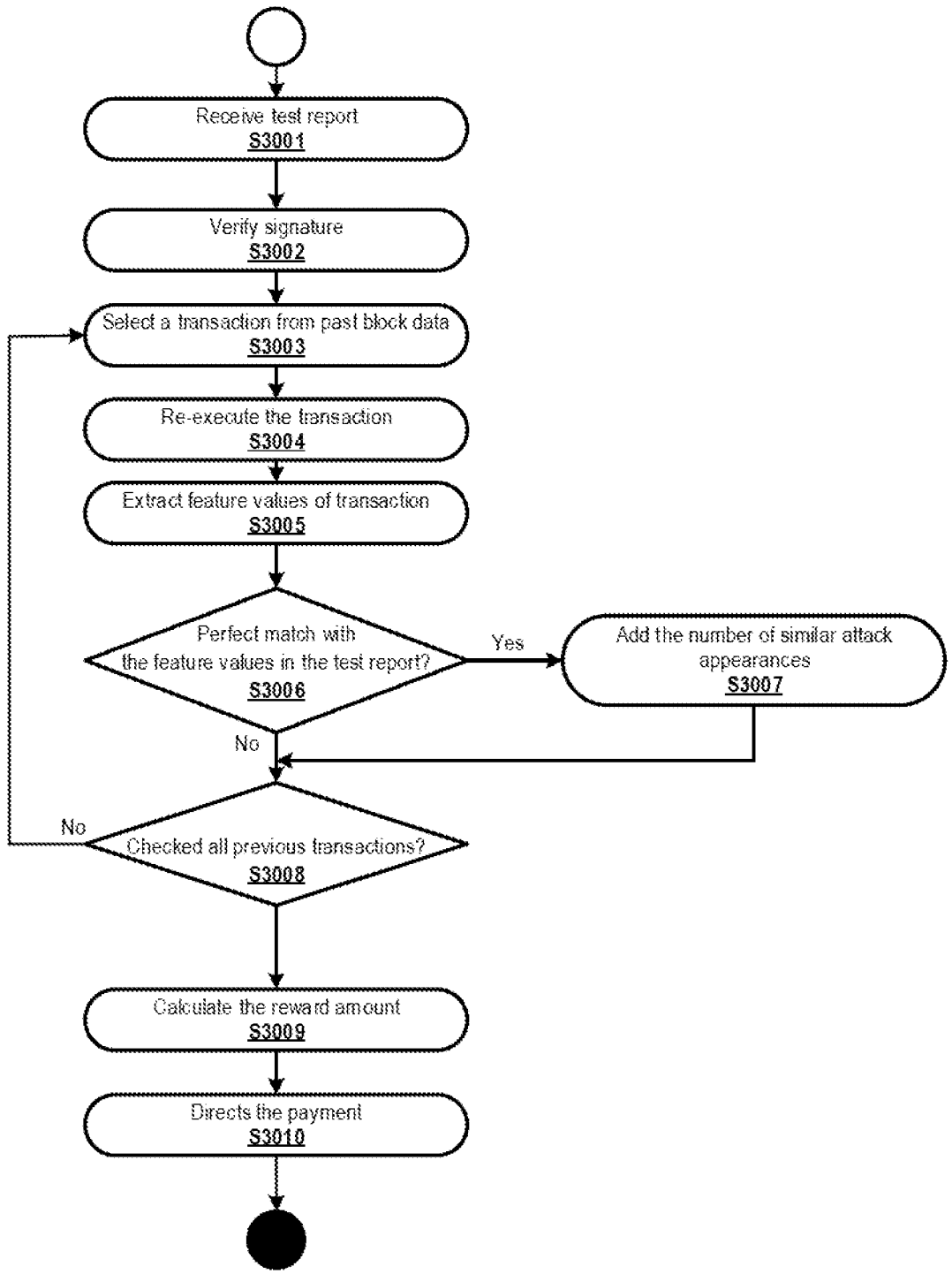
FIG. 11 illustrates an example process flow of the bug bounty server 200, in accordance with an example implementation.

FIG. 11 illustrates an example process flow of the bug bounty server 200, in accordance with an example implementation. At step S3001, the bug bounty server 200 receives the test report 800 from the end-user computer 100. The bug bounty server 200 then performs signature verification on the signature 802 of the test report 800 at step S3002. This confirms that the test report 800 was generated by the test report generator 430.

Next, the bounty calculator 210 compares the attack transaction to a transaction 480 in the historical data block 460 held by blockchain server 300 to determine the scarcity of the attack transaction in order to determine the corresponding reward amount. First, a transaction 480 in the historical data block 460 is selected at step S3003. Then, the bounty calculator 210 re-executes the selected transaction 480 at runtime 440 at step S3004. At step S3005, the feature extractor 422 then extracts the features of the selected transaction 480. At step S3006, the feature extractor 422 then compares the feature values 600 contained in the test report 800 with the feature values obtained in step S3005 to determine if a match exists between the two sets of feature values.

If the two sets of feature values match, the bounty calculator 210 then adds one to a number/counter representing similar attacks and records it in memory at step S3007 and the process continues to step S3008, where a determination is made as to whether all prior transactions 480 stored in the historical data block 460 have been checked. On the other hand, if there is no match between the two sets of feature values at step S3006, then the process continues to step S3008.

If the answer is no at step S3008, then the process loops back to step S3003, where a different transaction 480 is selected from the historical data block 460. If the answer is yes at step S3008, then the process continues to step S3009, where the bounty calculator 210 calculates the appropriate reward amount. At this point, the corresponding reward amount can be adjusted (increased or decreased) depending on the value of environment information 803 of the test report 800. For example, TEEs that are not up-to-date are at risk of side-channel attacks, so the bounty calculator 210 reduces the associated bounty amounts. At step S3010, the bounty calculator 210 then directs/instructs bounty payment smart contract 412 to pay the test report generator 430 the calculated incentive amount. As in this example, the scarcity of attack transactions can be determined by calculating the feature values of the transaction and comparing it to the feature values of past transactions. Then, by calculating the reward amount based on this, it is possible to pay higher rewards for rarer bugs which are harder to discover.

Figure 12:
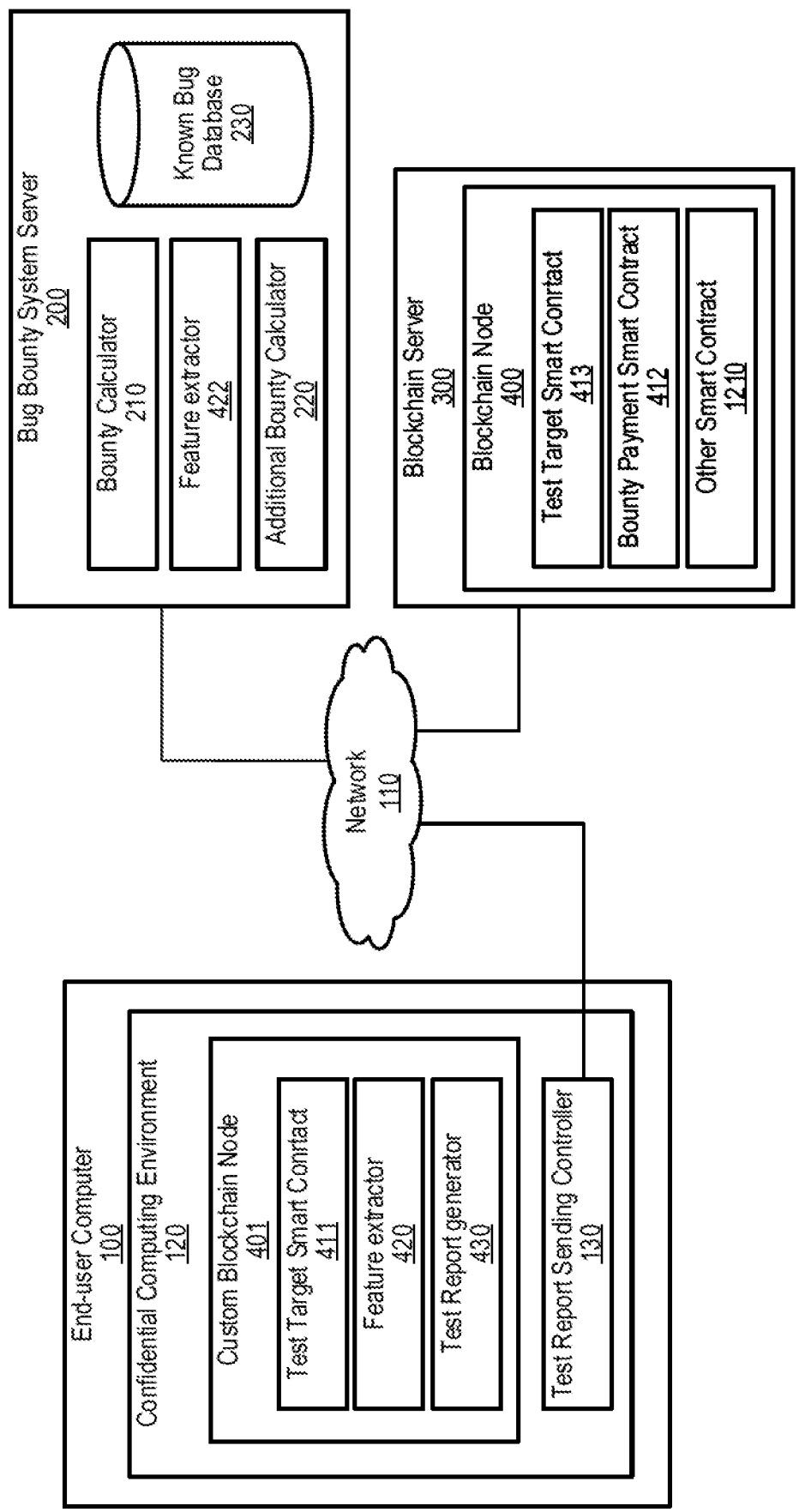
FIG. 12 illustrates an example of alternative implementation of bug bounty system/platform, according to an example implementation.

FIG. 12 illustrates an alternate example implementation of bug bounty system/platform, according to an example implementation. As illustrated in FIG. 12, the components are largely identical to those contained in the bug bounty system/platform 1 of FIG. 1. However, the bug bounty server 200 of FIG. 12 has the additional components of additional bounty calculator 220 and a known bug database 230. After determining the reward amount for a transaction, the reward calculation section 210 stores the feature values and the reward payment destination information as existing bug information in the known bug database 230. The known bug database 230 is a database for storing information that relate to known bugs.

The feature extractor 422 sends the feature values to the additional bounty calculator 220, which compares the received feature values with the feature values of the past transactions stored in the known bug database 230. If a relationship/match exists, the additional bounty calculator 220 instructs the bounty payment smart contract 412 to pay an additional bounty to the attacker who discovered the bug in the past. The relevance, for example, may be whether the current attack is an application of a past attack. For example, if the past attack was an overflow attack and the current attack is an overflow attack plus a zero division attack, the new attack is deemed to be based on the past attack and additional bounty is paid.

Figure 13:
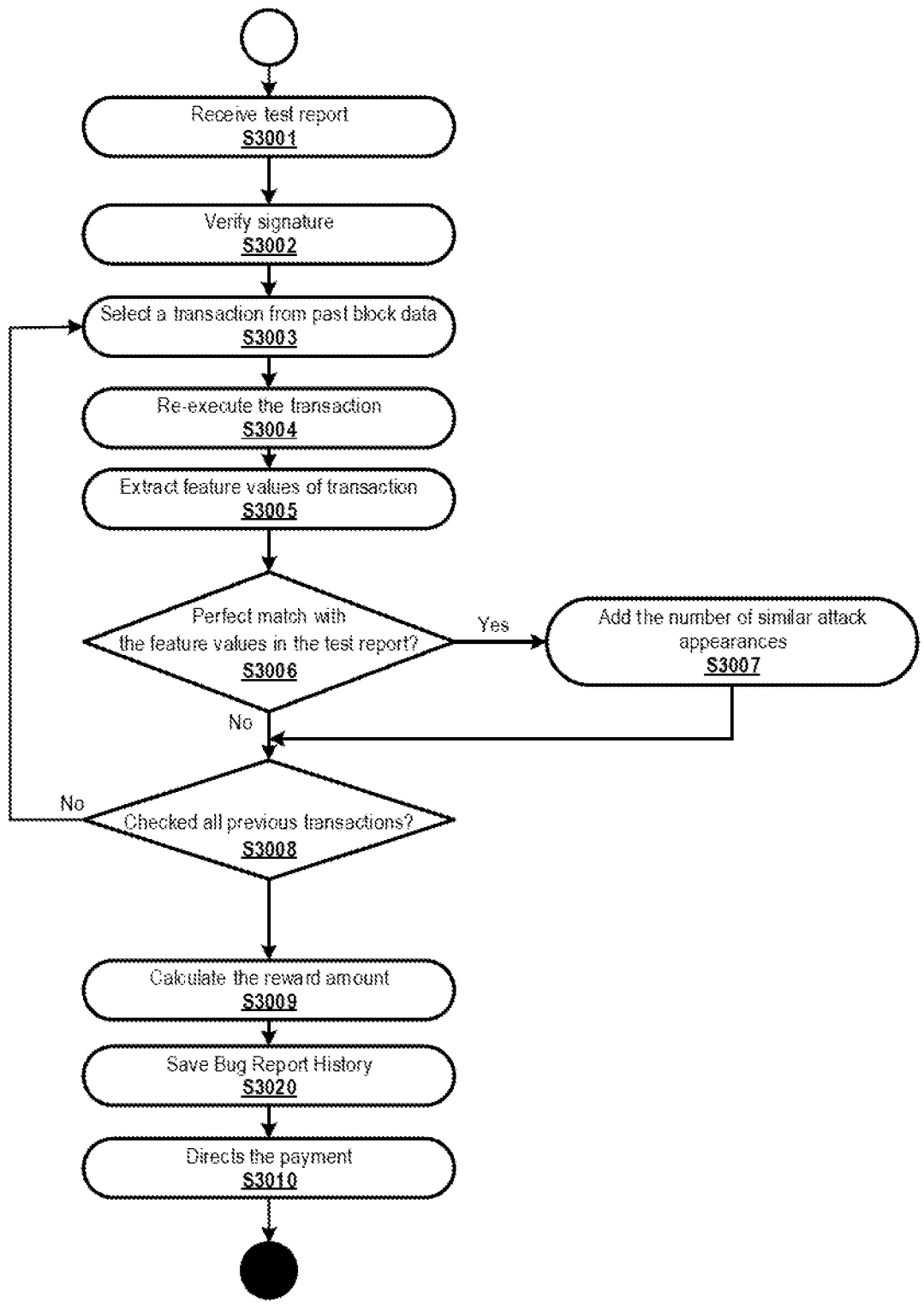
FIG. 13 illustrates an example process flow of the bug bounty server 200 of the alternative implementation of FIG. 12, in accordance with an example implementation.

FIG. 13 illustrates an example process flow of the bug bounty server 200 of the alternative implementation of FIG. 12, in accordance with an example implementation. The difference between FIG. 11 and FIG. 13 lies in the addition of step S3020 in FIG. 13. The bug bounty server 200 receives the test report 800 and determines the corresponding reward. After the bounty calculator 210 calculates the bounty amount at step S3009, the bounty calculator 210 stores the feature values of the attack transaction and the address to which the reward payment is to be made at step S3020.

Figure 14:
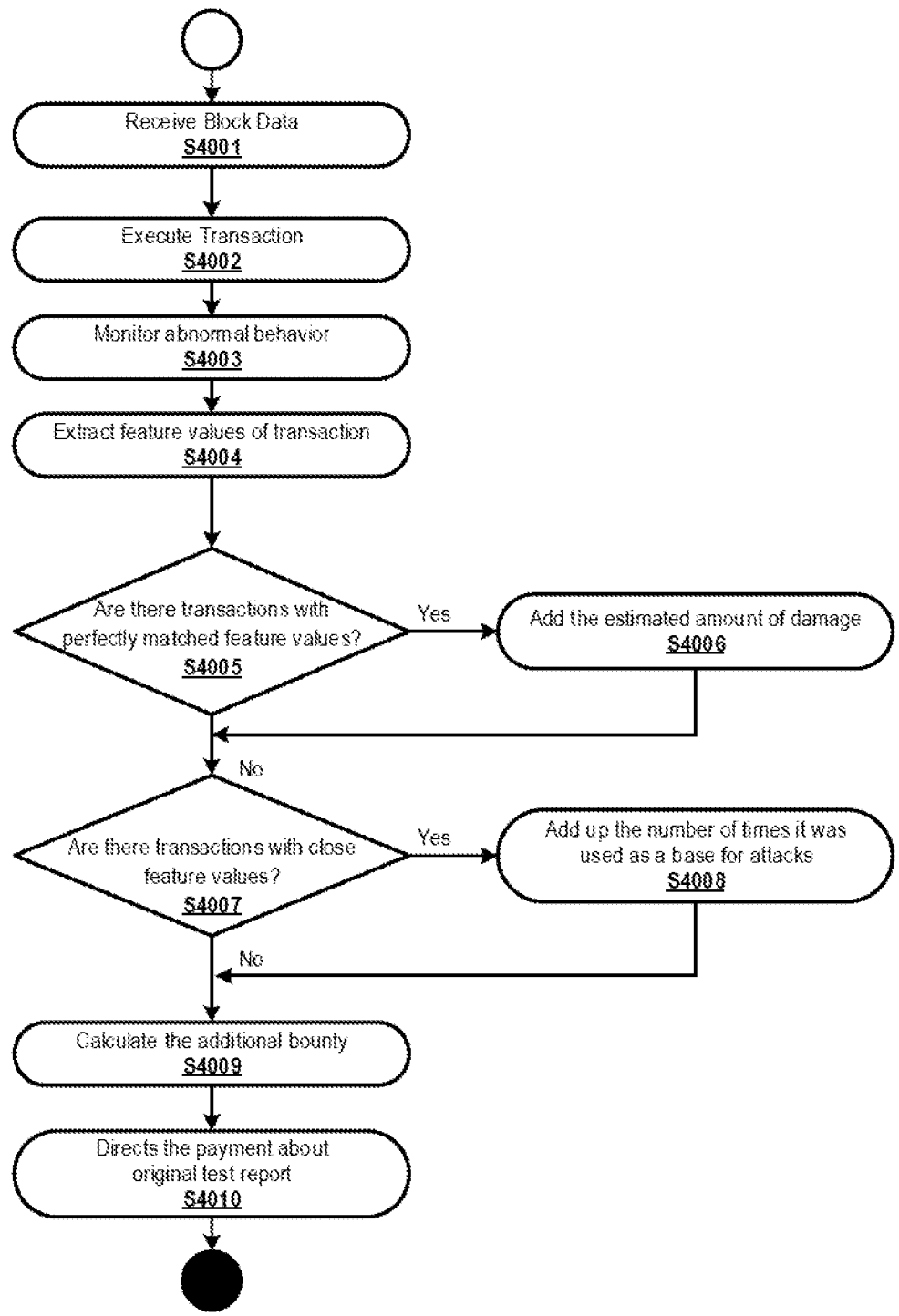
FIG. 14 illustrates an example process flow for additional bounty calculation and payment using the additional bounty calculator 220, in accordance with an example implementation.

FIG. 14 illustrates an example process flow for additional bounty calculation and payment using the additional bounty calculator 220, in accordance with an example implementation. At step S4001, data block 460 is received by a blockchain node 400. Blockchain node 400 in the blockchain server 300 operates as a production blockchain node and periodically receive the latest data blocks 460 from other blockchain nodes 400. At step S4002, the blockchain node 400 then executes the transaction (other smart contract 1210) in the received data block 460. Hereafter referred to as transaction A.

The feature extractor 422 then monitors the runtime 440 for abnormal state based on the abnormal state inspection method table 500 at step S4003. The feature extractor 422 then outputs feature values 600 and sends them to the additional bounty calculator 220 at step S4004. The additional bounty calculator 220 then checks the received feature values in the known bug database 230 to see if there is a match with previously obtained feature values at step S4005. For example, if the feature values just obtained are "B, C, Transfer" and the features values of past attack transactions are "B, C, Transfer", it can be determined that transaction A is the same attack transaction as the past attack transactions because of the forward B and C match. While smart contract 413 is fixed based on past test reports, other smart contract 1210 may carry similar vulnerability, and as a result, leads to similar attacks. Therefore, the additional bounty calculator 220 records the amount of remittance caused by transaction A in memory as the estimated damage at step S4006.

At this time, the bounty payment address of the corresponding past test report is also saved at the same time for later use in additional bounty payments. In addition, the additional bounty calculator 220 checks the feature values in the known bug database 230 to see if any of them is similar to the obtained feature values at step S4007. For example, if the feature values just obtained are "B, C, D, D, Transfer", and the feature values of past attack transactions are "B, C, Transfer", then since the forward B and C are identical, it can be determined that transaction A is an applied attack transaction based on a past attack transaction. If similarity is found to exist, the additional bounty calculator 220 then increments a number/counter of times the attack was based and records it in memory at step S4008. The additional bounty calculator 220 then determines an additional bounty amount based on the estimated amount of damage and the number of attacks at step S4009. For example, a method in which the reward amount is equal to the assumed damage amount up to a certain amount, or a method in which the reward amount is increased based on the number of similar attacks could be utilized.

At step S4010, the additional bounty calculator 220 instructs bounty payment smart contract 412 to pay the calculated bounty. As in this example, by monitoring other smart contracts on a regular basis even after a bug has been discovered, it is possible to assess the amount of expected damage if past defects were not corrected. In addition, it is possible to check whether past defects were basic vulnerabilities that could be used as the basis for an attack. This makes it possible to realize appropriate rewards, in the form of additional payments, according to the assessment of vulnerabilities that change over time.

Figure 15:
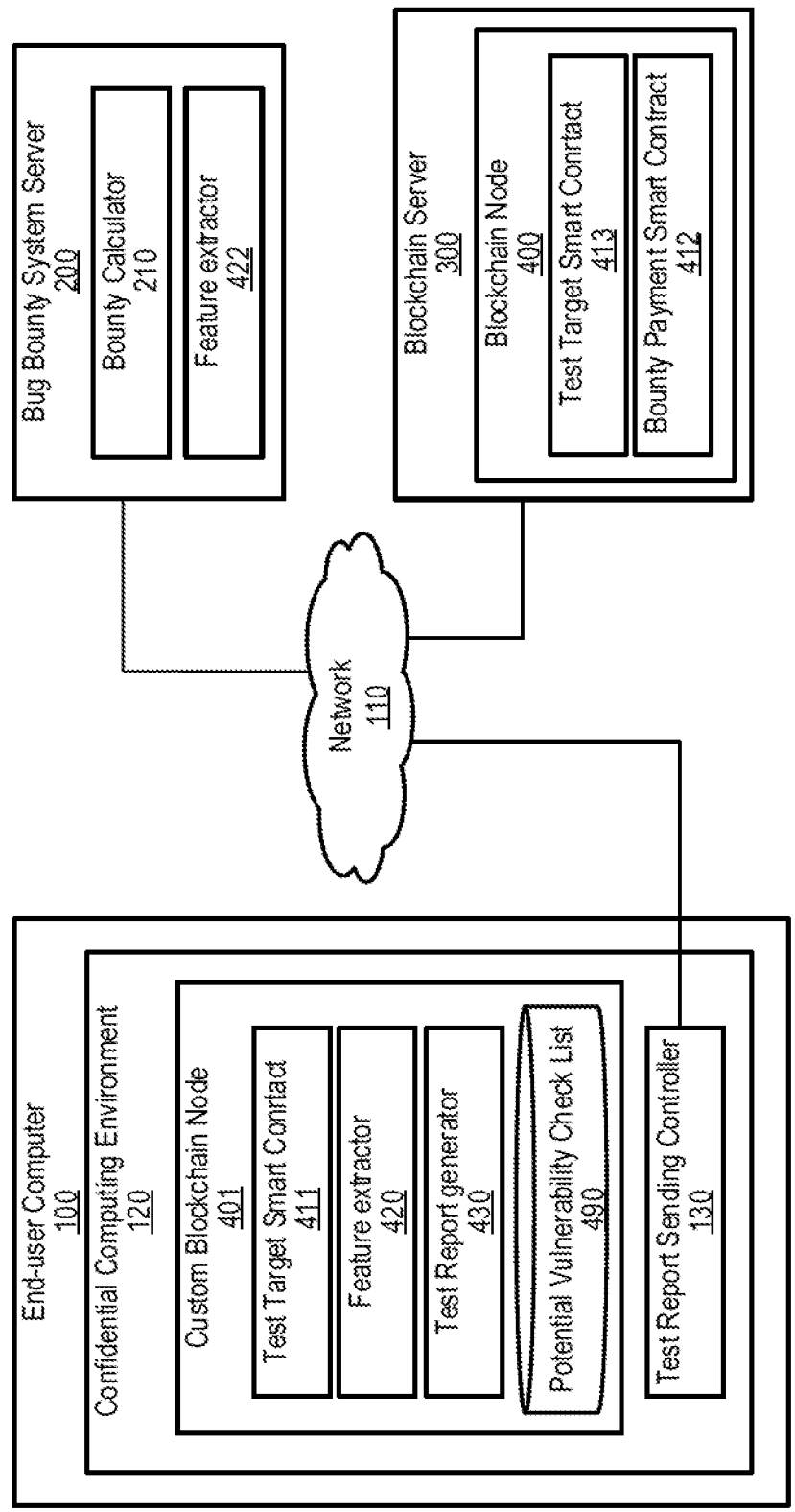
FIG. 15 illustrates an example of alternative implementation of bug bounty system/platform incorporating a potential vulnerability check list, according to an example implementation.
Figure 16:
FIG. 16 illustrates an example potential vulnerability check list 490, in accordance with an example implementation.

FIG. 15 illustrates an example of alternative implementation of bug bounty system/platform incorporating a potential vulnerability check list, according to an example implementation. As illustrated in FIG. 16, the components are largely identical to those contained in the bug bounty system/platform 1 of FIG. 1. However, the end-user computer of FIG. 16 has the additional component of potential vulnerability check list 490. The potential vulnerability check list 490 is know-how data for checking potentially vulnerable behavior in smart contracts. Potential vulnerability check list 490 is delivered by the bug bounty server administrator, as well as custom blockchain node 401.

Runtime 440 uses the potential vulnerability check list 490 during the execution of the test target smart contract 411 to see if any of the behaviors listed in the potential vulnerability check list 490 occurs. If any of the behaviors listed in the potential vulnerability check list 490 occurs, runtime 440 informs the test report generator 430 as to which potential vulnerability is present. The test report generator 430 generates a test report which includes the potential vulnerability information. Bounty calculator 210 then instructs bounty payment smart contract 412 to pay a bounty amount if the test report contains potential vulnerability information.

FIG. 16 illustrates an example potential vulnerability check list 490, in accordance with an example implementation. As illustrated in FIG. 16, the potential vulnerability check list 490 may include information such as state ID 1601, monitoring item 1602, and monitoring method 1603. State ID 1601 indicates the unique ID of the potentially vulnerable state to be checked. Monitoring item 1602 indicates the name of the potential vulnerability to be checked. Monitoring method 1603 indicates the method of monitoring the potential vulnerability. For example, to detect a re-entrant state where state ID 1601 is A, runtime 440 executes function A when executing a transaction. While re-entrant state is not a problem for normal program functions that are not blockchain, they can be a vulnerability in smart contracts. Therefore, it is meaningful to detect such a state.

Figure 17:
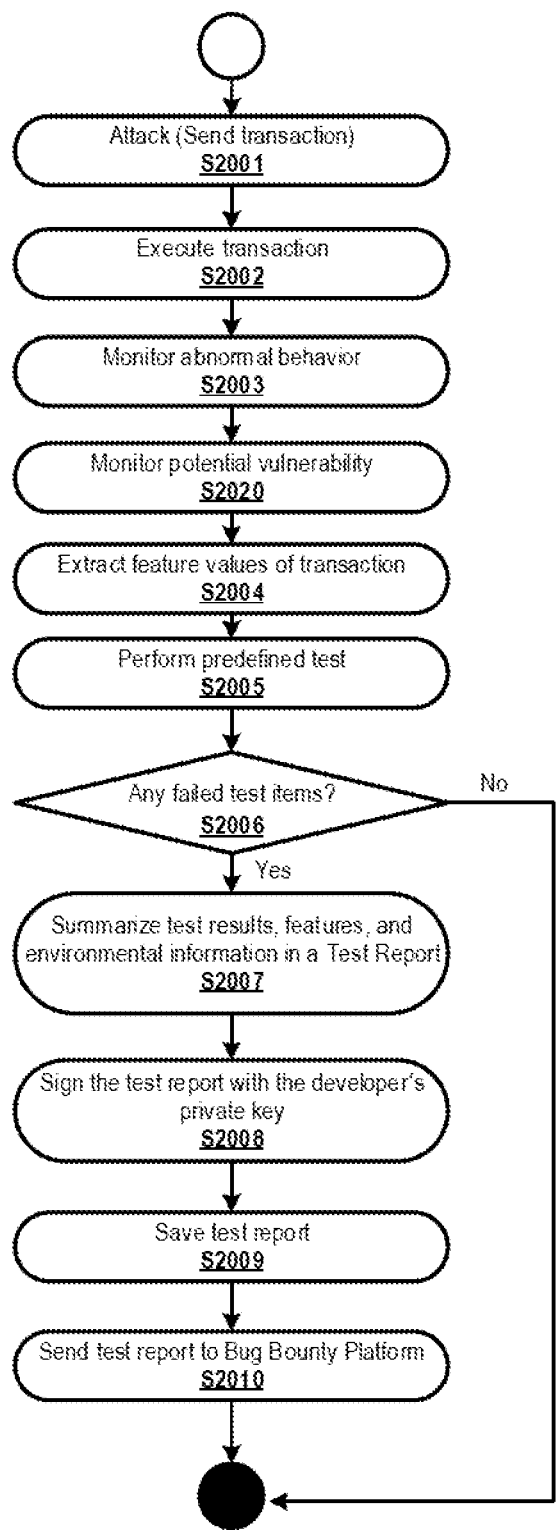
FIG. 17 illustrates an example process flow for testing smart contract vulnerabilities as executed by end-user using the alternative implementation of FIG. 15, in accordance with an example implementation.

FIG. 17 illustrates an example process flow for testing smart contract vulnerabilities as executed by end-user using the alternative implementation of FIG. 15, in accordance with an example implementation. Unlike FIG. 10, FIG. 17 has an additional step S2020, where, when the runtime 440 executes transaction 480, it executes each monitoring method 1603 on potential vulnerability check list 490 to check and see if test target smart contract 411 has a state which leads to potential vulnerabilities. If a matching behavior exists, the state ID 1601 is included in the test report 800. On receiving the test report 800, the bug bounty server 200 then instructs the bounty payment smart contract 412 to pay a certain bounty if state ID 1601 is included in the test report 800. As in this example, paying bounties for behavior that could potentially be a vulnerability in the blockchain can prevent serious incidents from occurring in the future.

The foregoing example implementation may have various benefits and advantages. For example, utilizing the bug bounty system/platform, end-users (attackers) can receive appropriate bounties that are derived based on the value of the vulnerabilities. End-users can receive appropriate bounty based on the assessment of the vulnerability as it changes over time. In addition, the bug bounty system/platform provides rapid disbursement of bounty payment. Furthermore, since the test report is generated in the confidential computing environment, the test results cannot be tampered with by the end-users.

Figure 18:
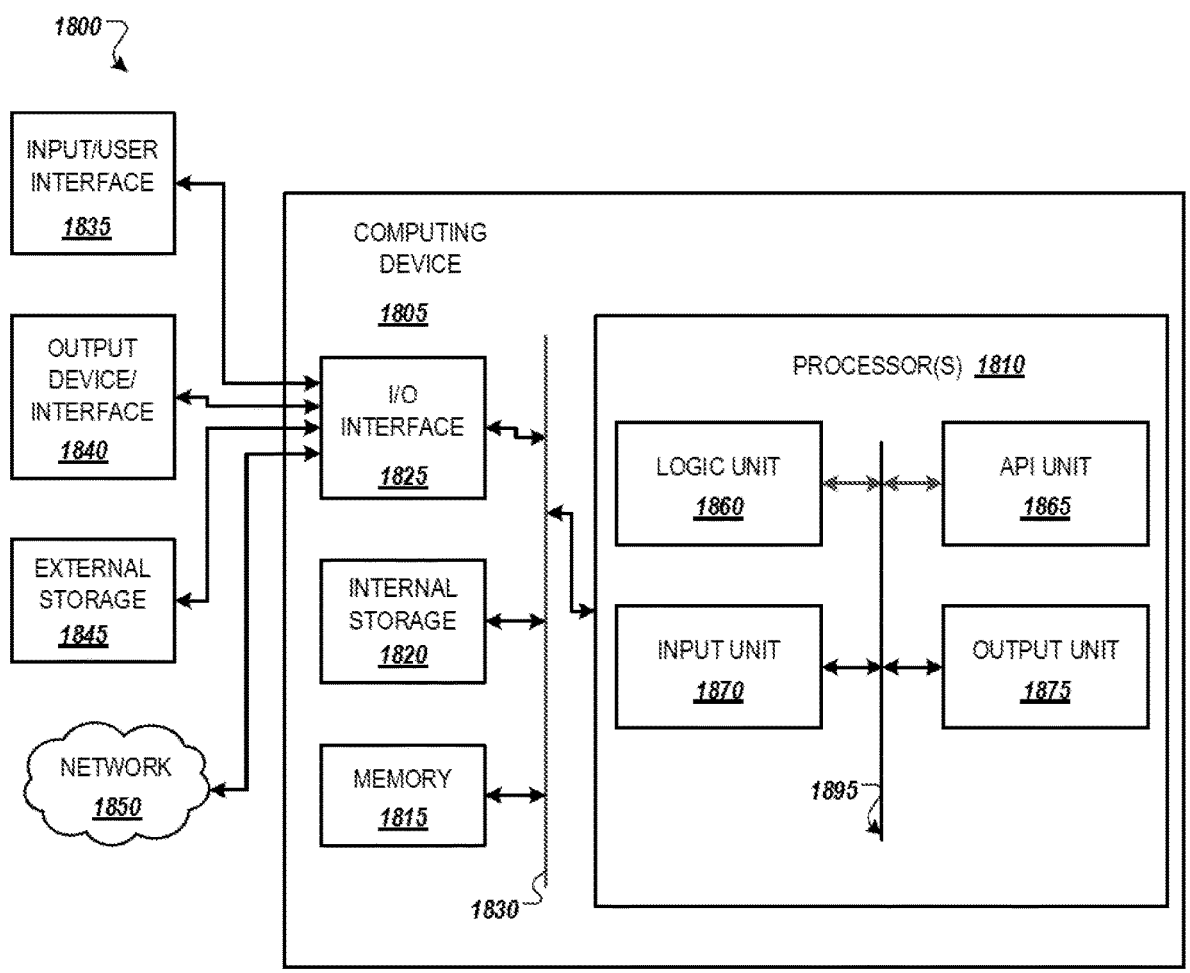
FIG. 18 illustrates an example computing environment with an example computer device suitable for use in some example implementations.

FIG. 18 illustrates an example computing environment with an example computer device suitable for use in some example implementations. Computer device 1805 in computing environment 1800 can include one or more processing units, cores, or processors 1810, memory 1815 (e.g., RAM, ROM, and/or the like), internal storage 1820 (e.g., magnetic, optical, solid-state storage, and/or organic), and/ or IO interface 1825, any of which can be coupled on a communication mechanism or bus 1830 for communicating information or embedded in the computer device 1805. IO interface 1825 is also configured to receive images from cameras or provide images to projectors or displays, depending on the desired implementation.

Computer device 1805 can be communicatively coupled to input/user interface 1835 and output device/interface 1840. Either one or both of the input/user interface 1835 and output device/interface 1840 can be a wired or wireless interface and can be detachable. Input/user interface 1835 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/ interface 1840 may include a display, television, monitor, printer, speaker, braille, or the like. In some example implementations, input/user interface 1835 and output device/ interface 1840 can be embedded with or physically coupled to the computer device 1805. In other example implementations, other computer devices may function as or provide the functions of input/user interface 1835 and output device/ interface 1840 for a computer device 1805.

Examples of computer device 1805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1805 can be communicatively coupled (e.g., via IO interface 1825) to external storage 1845 and network 1850 for communicating with any number of networked components, devices, and systems, including one or more computer devices of the same or different configuration. Computer device 1805 or any connected computer device can be functioning as, providing services of, or referred to as a server, client, thin server, general machine, special-purpose machine, or another label.

IO interface 1825 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1800. Network 1850 can be any network or combination of networks (e.g., the Internet, local area network, wide area network, a telephonic network, a cellular network, satellite network, and the like).

Computer device 1805 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++™, C#™, Java™, Visual Basic™, Python™, Perl™, JavaScript™, and others).

Processor(s) 1810 can execute under any operating system (OS) (not shown), in a native or virtual environment. One or more applications can be deployed that include logic unit 1860, application programming interface (API) unit 1865, input unit 1870, output unit 1875, and inter-unit communication mechanism 1895 for the different units to communicate with each other, with the OS, and with other applications (not shown). The described units and elements can be varied in design, function, configuration, or implementation and are not limited to the descriptions provided. Processor(s) 1810 can be in the form of hardware processors such as central processing units (CPUs) or in a combination of hardware and software units.

In some example implementations, when information or an execution instruction is received by API unit 1865, it may be communicated to one or more other units (e.g., logic unit 1860, input unit 1870, output unit 1875). In some instances, logic unit 1860 may be configured to control the information flow among the units and direct the services provided by API unit 1865, the input unit 1870, the output unit 1875, in some example implementations described above. For example, the flow of one or more processes or implementations may be controlled by logic unit 1860 alone or in conjunction with API unit 1865. The input unit 1870 may be configured to obtain input for the calculations described in the example implementations, and the output unit 1875 may be configured to provide an output based on the calculations described in example implementations.

Processor(s) 1810 can be configured to perform bug detection by issuing a transaction for execution in runtime of a private blockchain system, wherein the private blockchain system is set in a first node of a plurality of nodes, and the first node is a private blockchain node as shown in FIGS. 1, 4, and 10. The processor(s) 1810 may also be configured to monitor the transaction in the runtime and outputting first feature values associated with the transaction, wherein the first feature values are generated by performing feature extraction on the transaction as shown in FIGS. 1, 4, and 10. The processor(s) 1810 may also be configured to communicate with an external system as shown in FIGS. 1, 4, and 10. The processor(s) 1810 may also be configured to receive the first feature values as shown in FIGS. 1, 4, and 10. The processor(s) 1810 may also be configured to extract features of past transactions stored in nodes other than the first node of the plurality of nodes and outputting second feature values associated with the past transactions as shown in FIGS. 1, 4, and 10. The processor(s) 1810 may also be configured to generate bounty information corresponding to a bug alert in the transaction, wherein the bounty information is generated by comparing the first feature values with the second feature values as shown in FIGS. 1, 4, and 10. The processor(s) 1810 may also be configured to instruct payment of bounty based on the bounty information as shown in FIGS. 1, 4, and 10.

The processor(s) 1810 may also be configured to store potential vulnerability information as shown in FIGS. 15-17. The processor(s) 1810 may also be configured to determine whether a state of the runtime of the transaction matches any state identified in the potential vulnerability information as shown in FIGS. 15-17. The processor(s) 1810 may also be configured to, for the state of the runtime matching any state identified in the potential vulnerability information, include the state of the runtime in the test report as shown in FIGS. 15-17. The processor(s) 1810 may also be configured to instruct payment of an additional bounty based on the state of the runtime included in the test report as shown in FIGS. 15-17.

The processor(s) 1810 may also be configured to store known bugs and feature values associated with the known bugs in a database as shown in FIGS. 12-14. The processor(s) 1810 may also be configured to compare the first feature values against the feature values associated with the known bugs as shown in FIGS. 12-14. The processor(s) 1810 may also be configured to, for the first feature values matching third feature values associated with a known bug of the known bugs, generate a second bounty information and instructing payment of bounty based on the second bounty information to discoverer of the known bug associated with the third feature values as shown in FIGS. 12-14.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A bug bounty generation system, the system comprising:
 a plurality of nodes;
 a private blockchain system being set in a first node of the plurality of nodes, wherein the first node is a private blockchain node, and the private blockchain system comprises:
 a first processor configured to:
 receive a transaction for execution in runtime for bug detection, and
 monitor the transaction in the runtime and extract features of the transaction to output first feature values; and
 an external system in communication with the private blockchain system, the external system comprises:

a second processor configured to:
extract features of past transactions stored in nodes other than the first node of the plurality of nodes and outputs second feature values; and
generate a bounty information corresponding to a bug alert in the transaction, wherein the bounty information is generated based on (i) a degree of similarity between the first feature values and the second feature values by comparing the first feature values with the second feature values; and (ii) rarity, basicity, and scale of damage of a bug detected in the transaction,
wherein the second processor instructs payment of bounty based on the bounty information, and
wherein the nodes other than the first node of the plurality of nodes are physical blockchain nodes,
wherein the first processor generate a test report to the external system.

2. The system of claim 1, wherein the external system exists on a server.

3. The system of claim 1, wherein the nodes other than the first node of the plurality of nodes together form a blockchain network.

4. The system of claim 1, wherein the private blockchain system is downloaded and executed on a confidential computing environment of a user device.

5. The system of claim 1, wherein the transaction is an arbitrary transaction for testing a smart contract.

6. The system of claim 1, wherein
the test report comprises the first feature values and proof of verification.

7. The system of claim 6,
wherein the private blockchain system further stores potential vulnerability information;
wherein the runtime determines whether a state of the runtime changed by the transaction by the first processor matches any state identified in the potential vulnerability information;
wherein, for the state of the runtime matching any state identified in the potential vulnerability information, including the state of the runtime in the test report; and
wherein the second processor instructs payment of an additional bounty based on the state of runtime included in the test report.

8. The system of claim 1, wherein the bounty information is generated by comparing the first feature values with the second feature values through the second processor being further configured to:
compare the first feature values with the second feature values to determine a number of similar attacks associated with the past transactions; and
generate and adjust the bounty information based on the number of similar attacks associated with the past transactions.

9. The system of claim 1, wherein the external system further comprises:
a database for storing known bugs of the bug bounty generation system and feature values associated with the known bugs;
the second processor is further configured to compare the first feature values against the feature values associated with the known bugs; and
for the first feature values matching third feature values associated with a known bug of the known bugs, the second processor is further configured to generate a second bounty information and instructing payment of bounty based on the second bounty information to discoverer of the known bug associated with the third feature values.

10. A method for generating blockchain bug bounty, the method comprising:
performing, by a first processor, bug detection by issuing a transaction for execution in runtime of a private blockchain system, wherein the private blockchain system is set in a first node of a plurality of nodes, and the first node is a private blockchain node;
monitoring the transaction in the runtime and outputting first feature values associated with the transaction, wherein the first feature values are generated by performing feature extraction on the transaction;
communicating with an external system, wherein the external system performs:
receiving, by a second processor, the first feature values;
extracting, by the second processor, features of past transactions stored in nodes other than the first node of the plurality of nodes and outputting second feature values associated with the past transactions;
generating, by the second processor, bounty information corresponding to a bug alert in the transaction, wherein the bounty information is generated based on (i) a degree of similarity between the first feature values and the second feature values by comparing the first feature values with the second feature values, and (ii) rarity, basicity, and scale of damage of a bug detected in the transaction; and
instructing, by the second processor, payment of bounty based on the bounty information,
wherein the nodes other than the first node of the plurality of nodes are physical blockchain nodes,
wherein the first processor generate a test report to the external system.

11. The method of claim 10, wherein the external system exists on a server.

12. The method of claim 10, wherein the nodes other than the first node of the plurality of nodes together form a blockchain network.

13. The method of claim 10, wherein the private blockchain system is downloaded and executed on a confidential computing environment of a user device.

14. The method of claim 10, wherein the transaction is an arbitrary transaction for testing a smart contract.

15. The method of claim 10, wherein
the test report comprises the first feature values and proof of verification; and.

16. The method of claim 15, further comprising:
storing, by the private blockchain system, potential vulnerability information;
determining, by the first processor, whether a state of the runtime of the transaction matches any state identified in the potential vulnerability information;
for the state of the runtime matching any state identified in the potential vulnerability information, including the state of the runtime in the test report; and
instructing, by the second processor, payment of an additional bounty based on the state of the runtime included in the test report.

17. The method of claim 10, wherein the bounty information is generated by comparing the first feature values with the second feature values through a process comprising:

comparing, by the second processor, the first feature values with the second feature values to determine a number of similar attacks associated with the past transactions; and generating and adjusting, by the second processor, the bounty information based on the number of similar attacks associated with the past transactions.

18. The method of claim 10, further comprising:

storing known bugs and feature values associated with the known bugs in a database;

comparing, by the second processor, the first feature values against the feature values associated with the known bugs; and for the first feature values matching third feature values associated with a known bug of the known bugs, generating, by the second processor, a second bounty information and instructing payment of bounty based on the second bounty information to discoverer of the known bug associated with the third feature values.

* * * * *